June 17, 1958 R. G. PIETY 2,839,149

METHOD OF AND APPARATUS FOR MULTIPLYING AND INTEGRATING VARIABLES

Filed May 19, 1950

3 Sheets-Sheet 1

INVENTOR.
R. G. PIETY
BY Hudson & Young
ATTORNEYS

June 17, 1958 R. G. PIETY 2,839,149

METHOD OF AND APPARATUS FOR MULTIPLYING AND INTEGRATING VARIABLES

Filed May 19, 1950 3 Sheets-Sheet 2

INVENTOR.
R. G. PIETY

BY Hudson & Young

ATTORNEYS

June 17, 1958 R. G. PIETY 2,839,149

METHOD OF AND APPARATUS FOR MULTIPLYING AND INTEGRATING VARIABLES

Filed May 19, 1950 3 Sheets-Sheet 3

INVENTOR.
R. G. PIETY

BY Hudson & Young

ATTORNEYS

United States Patent Office 2,839,149

Patented June 17, 1958

2,839,149

METHOD OF AND APPARATUS FOR MULTIPLYING AND INTEGRATING VARIABLES

Raymond G. Piety, Bartlesville, Okla., assignor to Phillips Petroleum Company, a corporation of Delaware Application May 19, 1950, Serial No. 162,986

29 Claims. (Cl. 181—.5)

This invention relates to computers. In one specific aspect, it relates to apparatus for the algebraic multiplication of a plurality of functions. In another specific aspect, it relates to the integration of the product of a plurality of functions over a preselected range. In still another aspect it relates to the interpretation of seismic signals.

Heretofore, it has been proposed to record two functions to be multiplied and integrated over a portion of their range upon a sensitized plate or film, the films for the functions jointly controlling the amount of light passing from a source to a radiation-sensitive device, such as a photoelectric cell. In such devices, rather complicated mechanism has been required to properly carry out the algebraic multiplication. This arises from the fact that multiplication of two positive quantities or two negative quantities yields a positive result whereas multiplication of a positive quantity and a negative quantity yields a negative result.

This problem, in the past, has been approached by utilizing a plurality of films or other recording media for each function. The regions where both functions are positive or both functions are negative were separately multiplied and summed to provide the positive portion of the result and a separate multiplication and summation was made of the portions of the two functions where one function was positive and the other negative to provide the negative portion of the result. The positive and negative portions were then subtracted from each other to yield the algebraic product of the functions. It is quite evident that such a procedure requires a rather complicated apparatus in separately multiplying and summing different parts of the functions. In addition, difficulties arise and a great deal of time is consumed in producing a plurality of records of the same function. In accordance with my invention, proper algebraic multiplication of the functions is obtained with only one record of each function, and there is no necessity for providing separate elements of the apparatus for obtaining the positive and negative portions of the result.

The computer of my invention is particularly suitable for the recording of seismic signals and for the transformation of the recorded signals in such fashion as to greatly increase the amount of information obtainable therefrom. Heretofore, seismic signals produced by detonation of an explosive charge at a shot point have been picked up, after reflection from subterranean strata, by seismometers which produce an electrical output representative of the seismic waves incident thereon. These signals have been fed to a recording device which produces a direct record of the seismometer output. Ordinarily, a number of seismometers are positioned in a predetermined geometric array and the seismometer signals are recorded at a common recorder unit.

The seismic signals thus recorded are complex waves which are made up of many components. The wave form produced by the reflection from a discontinuity, such as the interface between two formations may be identified with a considerable degree of accuracy by statistical analysis. If the reflections were spaced a considerable distance apart, this wave form could be readily distinguished upon the recording medium and the reflection from the same discontinuity could be followed upon the records of the several seismometers in the array. However, this is seldom, if ever, the case. Ordinarily, reflections are spaced so closely together that the reflection patterns from a number of discontinuities are superposed to form a wave of complex character. Thus, the simple reflections, which are hereinafter referred to as elementary events, cannot be identified with any substantial degree of precision upon the seismometer records. The interpretation of the recordings is further complicated by the fact that surface waves, random disturbances produced by wind and the falling of debris to the earth as a result of the detonation of the charge, also appear upon the seismometer records and make the identification of elementary events a matter of great complexity.

Efforts have been made to improve the usefulness of seismic records. These improvements have involved filters, other tuning systems, seismometers of higher sensitivity, and methods of mixing signals from different seismometers to eliminate unwanted waves, such as surface waves. Although these techniques greatly improved the usefulness of data obtained from seismic records, such records still yeld insufficient information concerning elementary events to enable the records to be interpreted with a high degree of precision.

In accordance with my invention, seismic signals are fed to a novel recording device which produces a photographic record of the seismic signals upon a transparent medium. The recordings thus produced may be considered to represent a mathematical relationship between time and the amplitude of the seismic signals. This methematical function is multiplied by a second predetermined mathematical function also recorded upon a transparent medium and the results of this multiplication are integrated over a predetermined range to yield a transformed output, either for one seismometer or for each seismometer in the array. By proper choice of the second predetermined function the seismometer output may be transfomed in a manner equivalent to passing the seismoter output through an ideal electrical filter. Alternatively, the outputs of any desired seismometers may be multiplied by a chosen weighting function. Finally, the function representing the seismometer output may be correlated either with itself or with a function representing an ideal elementary event to determine with a high degree of precision the exact time of occurrence of elementary events in the original seismometer signal. The multiplication and integration of functions just referred to are carried out in a simple manner without involving the use of complicated mechanical expedients for carrying out algebraic multiplication and integration of the functions. Furthermore, by the use of the techniques of this invention, any two functions may be multiplied and integrated, and these functions may either be mathematical functions or the output of any measuring instrument to which it is desired to apply a mathematical transformation.

It is an object of the invention to provide an improved apparatus for multiplying a plurality of functions and integrating these functions to effect a desired mathematical transformation thereof.

It is a further object to provide a method of and apparatus for correlating a seismic record either with elementary events appearing in the record itself or with an ideal elementary event having a wave form determined by statistical considerations.

It is a further object to provide apparatus for multiplying a plurality of functions without the use of involved mechanical devices for carrying out algebraic multiplication.

It is a further object to provide a computer for increasing the amount of information obtainable from seismic records.

It is a still further object to provide apparatus for transforming seismometer outputs by mathematical operations which is equivalent to passing the seismometer output through an ideal electrical filter.

It is a still further object to provide apparatus for mixing the outputs of seismometers, each output being multiplied by a chosen weighting function.

Various other objects, advantages and features of the invention will become apparent from the following detailed description taken in conjunction with the accompanying drawings, in which.

Figures 2, 3, 8:
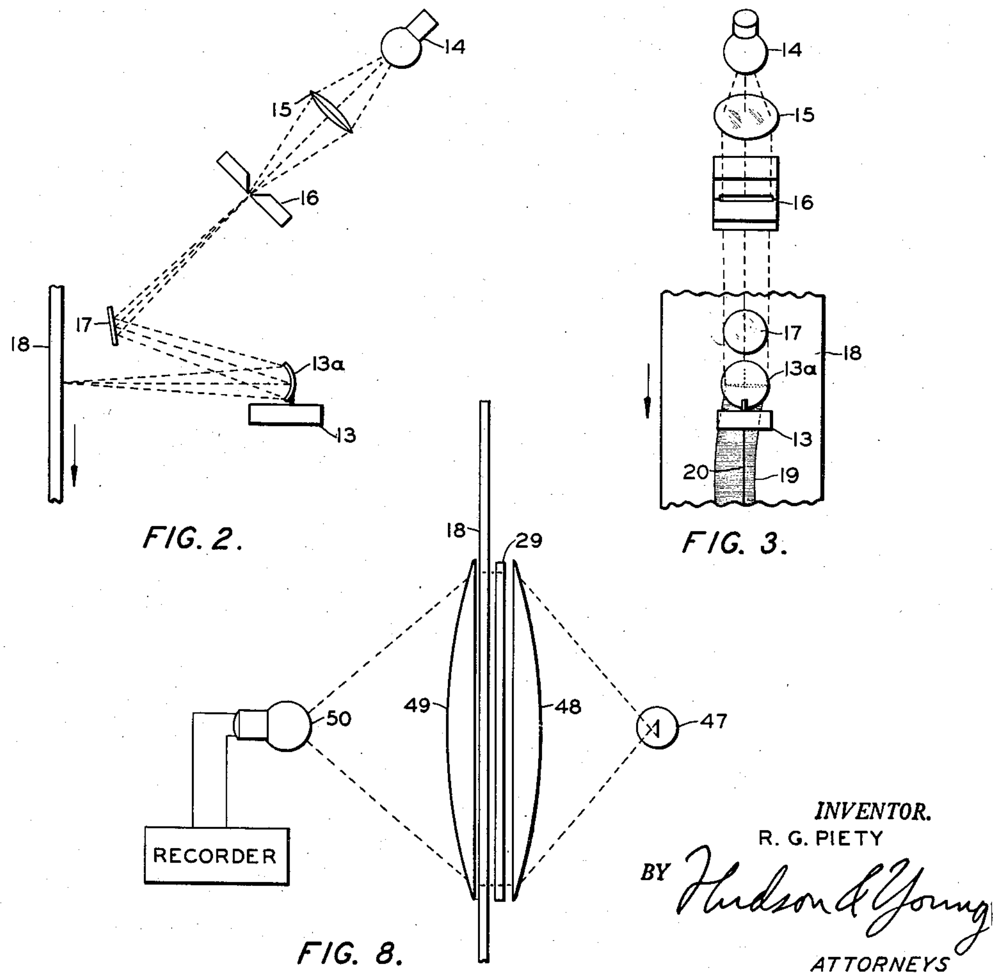
Figures 2 and 3 are schematic diagrams of one channel of the recording apparatus.
Figures 5, 6, 7:
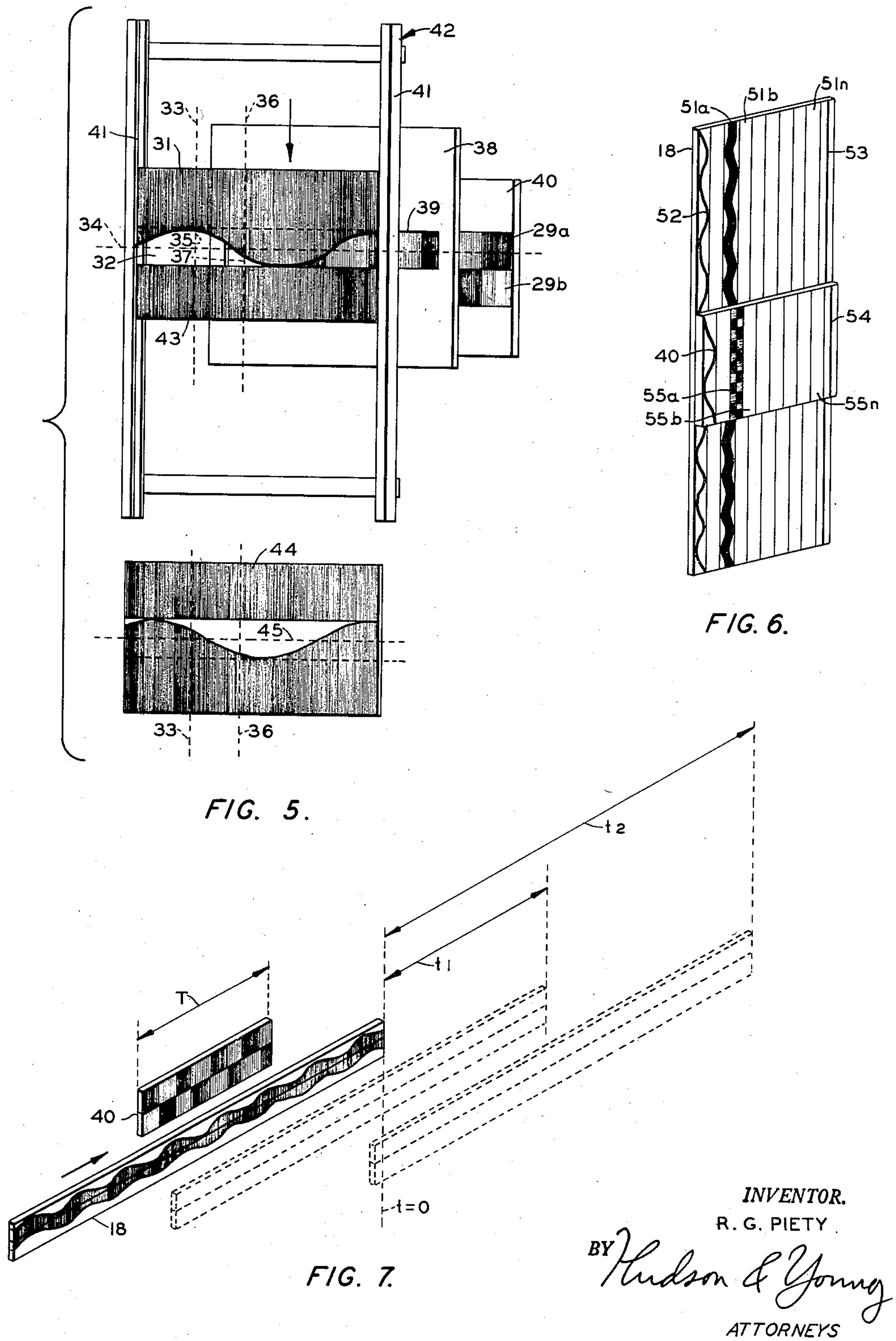

Figures 4 and 4*a* to 4*e*, inclusive, are graphs illustrating the mathematical multiplication of two functions;

Figure 5 is a schematic view illustrating a method of producing a modified recording of a function;

Figure 6 is a diagrammatic view illustrating the reproducing apparatus;

Figure 7 is a schematic diagram illustrating the integration of the product of two functions; and Figure 8 is a view illustrating the optical system of the reproducer unit.

Figure 1:
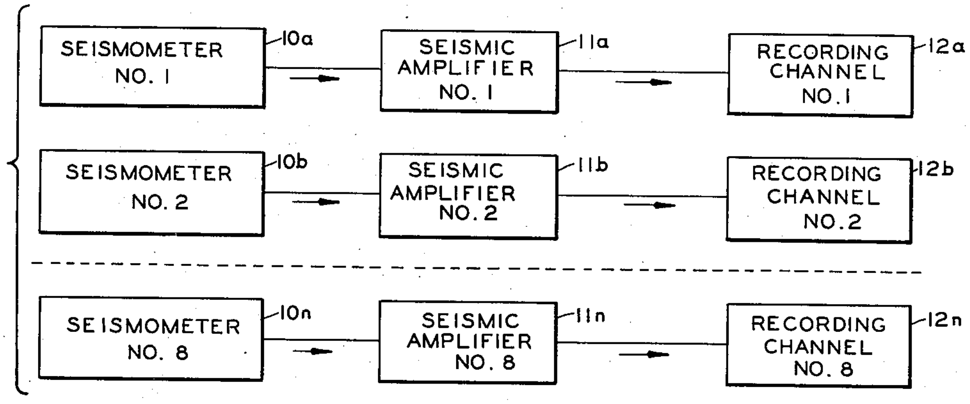
Figure 1 is a block diagram of the recording system of my invention.

Referring now to the drawings in detail and particularly to Figure 1, the outputs of a plurality of seismometers **10*a*, 10*b*, . . ., 10*n* are fed through seismic amplifiers 11*a*, 11*b*, . . ., 11*n* to the respective recording channels 12*a*, 12*b*, . . ., 12*n* of my invention. Although the apparatus will be described in connection with the recording and transformation of seismic signals, the application of the apparatus to other uses will become apparent from the following description. Each recording channel 12 includes a galvanometer 13, Figure 2, the mirror of which is pivotally mounted and rotated through a small angular range by the seismic signals fed to the galvanometer from the amplifier 11**. That is, the angular displacement of the galvanometer mirror is proportional to the amplitude of the signals fed to the galvanometer by the amplifier. A galvanometer suitable for use in the apparatus of this invention is disclosed in the copending application of R. M. Ransier and G. B. Way, Serial No. 185,356, filed September 18, 1950, entitled Galvanometer, now Patent No. 2,729,789.

An optical system is provided in conjunction with the galvanometer 13 which includes a light source 14, a condensing lens 15, a slit assembly 16, a plane mirror 17, a mirror **13*a* forming a part of the galvanometer 13, and a plate 18 of glass or other transparent material. Thus, the light beam from source 14 is condensed by the lens 15 and the assembly 16 produces an elongated very thin pencil of light which is reflected by mirrors 17 and 13*a* upon the plate 18. The surface of plate 18 is coated with a photographic emulsion which is sensitized to the light beam produced by the source 14 and reflected thereon by the optical system. When no seismic signal is impressed upon the galvanometer, it is biased to a central or rest position by suitable springs, not shown, so that the thin beam of light is positioned at the center of the plate 18. When a positive signal is impressed upon the galvanometer by the seismic amplifier, the galvanometer pivots and the light beam is displaced leftwardly, Figure 3. Due to the small angle through which the galvanometer moves, the linear displacement of the beam is very closely proportional to the signal amplitude. In similar fashion, when a negative signal is impressed upon the galvanometer, the light beam is shifted rightwardly, Figure 3, by an amount which is proportional to the amplitude of the seismic signal. The amplitude of the signals is so regulated that the strongest signal to be recorded does not cause either side of the recorded band 19 to move beyond either side of the plate 18 nor does either side of the band pass beyond the center line 20 of the plate 18. Accordingly, in a preferred embodiment, the width of the band 19 is one-half that of the plate 18**.

During the recording period, the plate 18 is moved longitudinally past the galvanometer at a predetermined rate of speed. As a result, the beam of light reflected from galvanometer 13 produces, after development of the photographic emulsion, a wavy band of one-half the width of plate 18, this band being displaced laterally in response to the strength of the seismic signals incident upon the galvanometer.

Figure 4:
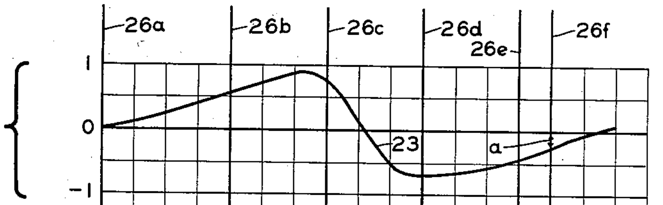
Figures 4A, 4B:
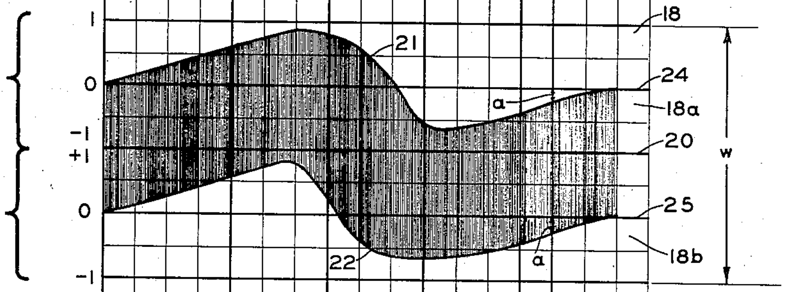

The band produced upon the recording plate is illustrated in more detail by Figures 4*a* and 4*b*. In these figures, it will be noted that the sides 21, 22 of the band are parallel, since the light beam produced by slit assembly 16 is of constant width. Furthermore, each side portion 21, 22 represents the mathematical relationship between time and amplitude indicated by graph 23, Figure 4*a*, with reference to the respective axes 24 and 25 which are positioned half way between center line 20 and the sides of plate 18. At the ordinate represented by vertical line **26*a*, the seismic signal is zero and the band 19 extends from axis 24 to axis 25. That is, the band is positioned exactly at the center of the plate 18. At ordinates 26*b* and 26*c*, a positive signal is applied to the galvanometer and the band 19 is, accordingly, shifted upwardly with respect to center line 20 and axes 24, 25. Ordinate 26*b* corresponds to a positive value of .6 unit for the function and it will be noted that the curve represented by the side 21 of the band is positioned .6 unit above axis 24 while, similarly, the curve represented by the side 22 of the band is positioned .6 unit above axis 25. The ordinates 26*d* and 26*e* represented negative signals applied to the galvanometer from the seismic amplifier and, accordingly, the band 19 is shifted downwardly with respect to the axis 20. Ordinate 26*d* represents a negative value of .7 unit and, accordingly, the curve represented by the side 21 of the band is positioned .7 unit below axis 24 while the curve represented by the side 22 is positioned .7 unit below the axis 25. Thus, the band 19 represents the mathematical relationship between the seismometer output and time represented by curve 23. When radiation is passed through the plate, at each element or ordinate, the upper half track or zone 18*a* transmits a proportion of the radiation incident thereon which is determined by the width of the non-opaque portion of the zone at that element. If the zone 18*a* be considered to have a reference or constant transmission when the ordinate of the curve represented on the plate is zero, that is, when band 19 is positioned at the exact center of the plate, it will be evident that the transmission of the zone 18*a* varies, with respect to the constant or reference transmission, in accordance with the negative of the values of function 23. Similarly, the transmission of lower half track or zone 18*b* varies, with respect to said constant or reference transmission, in accordance with the values of the function 23. A similar optical system is provided in each of the channels 12*b* to 12*n*, inclusive, and the opaque bands produced by the described optical system for each seismometer are recorded in side-by-side relationship upon the sensitized plate 18**.

Figure 4C:
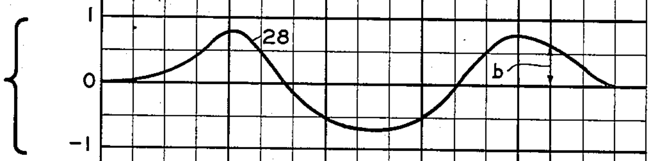

In accordance with the invention, the function represented by the seismometer output is multiplied by a predetermined function 28, Figure 4*c*, and the products of these functions are integrated. The function 28 may represent the characteristic of an ideal electrical filter or its wave form may represent an ideal elementary event, as determined from statistical considerations. Alternatively, the function 28 may represent a weighting function by which the output of the seismometer is to be multiplied. The weighted output may be mixed with the output of a second seismometer, which may be a rotational seismometer responsive only to rotational seismometer responsive only to rotational earth movements and not to translational earth movements. In this case, the mixed output represents a wave from which components representative of ground roll or surface waves have been eliminated. The manner in which the seismometer outputs are mixed is described in detail in my copending application, Serial No. 49,081, filed September 13, 1948, and now abandoned, entitled Method of and Apparatus for Seismic Exploration. Alternatively, the mixing may take place in the optical system of the computer. It should be further pointed out that, where the function 28 represents an ideal elementary event, the computer of this invention determines the correlation between this ideal elementary event and elementary events appearing on the original record, even though several such events are superposed. Where the function 28 represents a part of the original seismometer recording, the autocorrelation function is utilized to determine where wave forms appearing in selected parts of the record are repeated in other parts of the record.

Figure 4D:
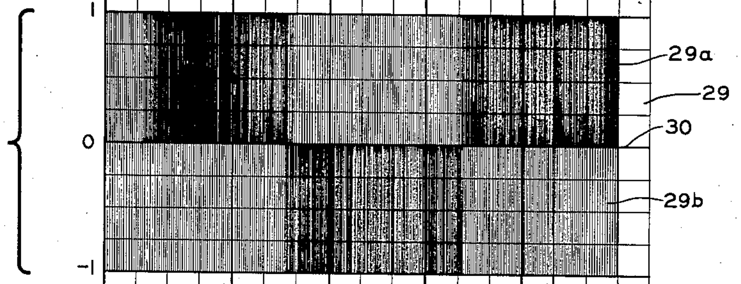
Figure 4E:
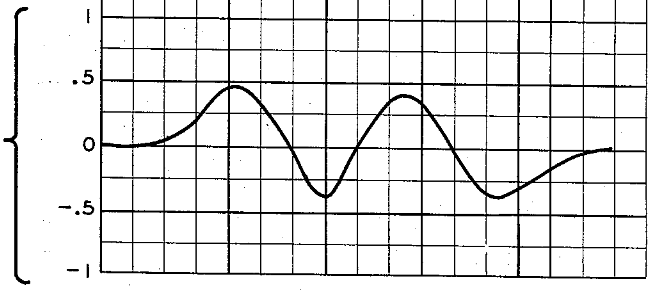

Preferably in accordance with the invention, the function 28 is recorded upon a variable density track 29, Figure 4*d*, which is divided into two half tracks **29*a*, 29*b* by a center line 30. Where the function represented by curve 28 has a zero value, both the upper and lower half tracks have a reference shade or hue which is a predetermined shade of gray, this condition being illustrated at the ordinate 26*a*. As the function assumes successively larger positive values, as in the region between ordinates 26*a* and 26*b*, the upper half track 29*a* becomes progressively darker, that is, more opaque than the reference shade while the lower half track becomes progressively lighter, that is, more transparent. Where the function reaches a large positive value, as at ordinate 26*b*, the upper half track is nearly opaque while the lower half track is nearly transparent. Similarly, when the function 28 assumes a negative value, the lower half track becomes darker or more opaque than the reference hue, the increment opacity being proportional to the negative value assumed by the function, while the upper half track becomes more transparent than the reference hue, the degree of transparency being proportional to the negative value of the function. The word "proportional" and its derivatives is used in a broad sense in the specification and appended claims. At ordinate 26*d*, for example, which represents a large negative value of the function, the lower half track is nearly opaque while the upper half track is nearly transparent. Thus, the opacity of the upper half track or zone 29*a* varies, with respect to the reference or constant opacity determined by the reference hue or shade of grey, in accordance with the positive values of the function 28, while the opacity of the lower half track or zone 29*b* varies with respect to such reference hue or opacity, in accordance with the negative values of the function 28**.

One method of making such a variable density plate is illustrated in Figure 5 in which the function to be recorded on the track is represented by a plate or mask 31 having a cut out portion 32 which is representative of the function to be recorded. Thus, at a typical ordinate 33, where the function has a positive value, the distance between the center line 34 of cut out portion 32 and the upper edge 35 is proportional to the magnitude of the function at that ordinate. Similarly, at a typical negative ordinate 36, the edge 37 of the cut out portion 32 is displaced below center line 34 by an amount which is proportional to the negative value of the function at that ordinate. Positioned below the plate 31 is a second plate or mask 38 having a slot 39 formed therein of the same width as that of one of the half tracks **29*a* or 29*b***, Figure 4*d*. A transparent plate 40 is positioned directly below the plate 38 and its surfacc is coated with a sensitized photographic emulsion which, when developed, has an opacity proportional to the length of time it is exposed to light radiation.

In the operation of the unit of Figure 5, a lamp, not shown, such as a recording lamp, is positioned in front of the plates 38 and 40 with the filament extending transversely with respect to the plates and parallel thereto. Thereupon, plate 31 is moved downwardly through tracks 41 formed in a frame structure 42 at a constant rate of speed. Initially, of course, the lower part 43 of plate 41 covers the slot 39 so that no light can pass through to the sensitized emulsion on plate 40. As the cut out portion 32 moves over the slot 39, each element of plate 40 is exposed to radiation for a length of time which is directly proportional to the width of the cut out portion 32 overlying such element. Thus, at ordinate 33, the cut out portion 32 is wide and, consequently, the element of plate 40 behind this ordinate is exposed over a long interval with the result that the plate, after development, is substantially opaque at this region. In contrast, at negative ordinate 36, the cut out portion 32 is narrow and the element of plate 40 underlying this element is exposed only a short length of time, with the result that it is nearly transparent after the photographic emulsion is developed. The sensitivity of the emulsion is, of course, adjusted so that the reference hue of grayness is obtained when the width of cut out portion 32 is one-half the width of the half track being formed, which corresponds to a zero ordinate for the function being recorded. Consequently, after the plate 31 is moved downwardly, as described, and the photographic emulsion is developed, the upper half track **29*a* is formed upon sensitized plate 40, this half track having a reference hue of gray when the function represented by mask 31** has a zero value, the half track increasing in opacity as the function assumes positive values and becoming more transparent as the function assumes negative values.

After recording the upper half track in the described manner, the plate is moved to a position where the lower half track **29*b* is positioned directly beneath slot 39. Thereupon, a second plate or mask 44 is passed downwardly through the slots 41 to record the lower half track upon the film. To this end, the plate 44 has a cut out portion 45 which is complementary to the cut out portion 32 of plate 31. That is, at any given ordinate, such as ordinate 33, the width of cut out portion 45 plus the width of the cut out portion 32 is equal to the total width of the half track. Accordingly, at an ordinate 33, where the function has a large positive value, the cut out portion 45 is narrow while the cut out portion 32 is wide and, at an ordinate 36, where the function has a large negative value, the cut out portion 45 is wide while the cut out portion 32 is narrow. Consequently, as the plate 44 is moved downwardly past slot 39 with the light source energized, the lower half track 29*b* is formed upon plate 40, this half track being complementary to half track 29*a* in the sense that, as half track 29*a* becomes more opaque, half track 29*b* becomes more transparent, and vice versa. It is convenient, in the actual forming of the variable density plate to record a number of tracks upon the plate 40** and then develop them simultaneously.

In the reproducer mechanism illustrated by Figure 8, the tracks 18, 29 are superposed and light from a source 47 is passed through a condenser lens 48 through both plates to a condenser lens 49 which focuses the radiation upon a photoelectric cell 50. The source 47 has a filament which is positioned in a plane parallel to that of the tracks and the condenser lens 48 forms an image of the filament extending laterally of the superposed plates. In actual practice, plate 18 has a number of recorded functions thereon which occupy the respective zones **51*a*, 51*b*, . . ., 51*n*** (see Figure 6), together with a timing wave 52 of sinusoidal characteristic and a straight reference line 53 which registers with a reference line 54 on plate 40 to permit accurate alignment of these plates in the apparatus. For each function recorded in the spaces 51, there is a corresponding function recorded on the corresponding zones 55a, 55b, . . ., 55n of the plate 40, the variable density zones having functions recorded thereon as set forth in connection with Figure 5. The described apparatus functions to multiply each corresponding set 51, 55 of functions and integrate the products over a preselected range of integration. In the case of a seismic system, the outputs of the respective seismometers are recorded at the respective zones 51 while the zones 55 are variable density recordings of the same or different functions with which it is desired to operate upon the seismometer outputs.

Due to the described arrangement of filament 47 and the condenser lenses 48, 49, the light incident upon each individual element of a variable density recording on plate 40 passes through a corresponding element of a variable area recording on plate 18, after which the radiation is collected by lens 49 and focused upon photoelectric cell 50. At each such element of the plates 18, 40, the light is partially absorbed and partially transmitted depending upon the opacity of plate 40 at that element and the position of the band 51 at that element. In accordance with the invention, the total light transmitted through both plates is directly proportional to the algebraic product of the values of the functions at that element.

This will become evident upon a study of Figure 4 in which, at ordinate 26a, where both functions 23 and 28 are zero, the upper half track 24 transmits a quantity proportional to one-half the light incident thereon and, similarly, the upper half track 29a transmits a quantity proportional to one-half the light incident thereon. Thus, the two upper half tracks 18a and 29a superimposed transmit a quantity proportional to one-fourth unit of light where, for convenience, the unit represents the quantity of light incident upon a typical element of the plates. Similarly, it will be evident that the two lower half tracks 18b and 29b, in combination, transmit a quantity proportional to one-fourth of a light unit. Thus, the total radiation passing to the photoelectric cell through the element represented by ordinate 26a is the sum of the upper and lower one-fourth units or one-half unit which, evidently, corresponds to a zero value for the multiplied functions, since both functions are zero. At a general ordinate 26f, it will be assumed for purposes of illustration that the ordinate of function 23 is "a" and the ordinate of function 28 is "b."

It also will be assumed that W is a constant depending upon the width and inherent transmission characteristics of plate 18 while R is a constant depending on the properties of the coating material on plate 29 together with its inherent transmission characteristics.

In particular, assuming plate 18 to be perfectly transparent and the exposed part of the coating to be perfectly opaque, at ordinate 26f, the transparent portion of half track 18a is $$\frac{w}{4}+(-a)$$

units in length (noting that the zero reference line is at the center of half track 18a), and the proportion of light transmtited there through is equal to $$\frac{\frac{w}{4}-a}{\frac{w}{2}}=\frac{1}{2}\left(1-\frac{a}{W}\right)$$

where W is equal to $$\frac{w}{4}.$$

and $w$ represents the total width of the plate 18 which is four units. If the plate is not perfectly transparent nor the exposed part of the coating perfectly opaque, there will be a different constant of proportionality relation $w$ and W but the relationship will be otherwise unchanged. Similarly the proportion of light transmitted through lower half track 18b is $$\frac{1}{2}\left(1+\frac{a}{w}\right)$$

Assuming that the coating on plate 29 varies from perfect transparency to a transmission "r," each half track 29a, 29b transmits $$\frac{r+1}{2}$$

of the light incident thereon when the coating is at its reference hue. At the general ordinate 26f, the transmission of half track 29a is "b" units less than the reference hue, which reference hue has been defined as a light transmission of ½. Accordingly, the transmission of half track 29a is $$\frac{1}{2}-\frac{b}{r}$$

Similarly, the transmission of half track 29b is "b" units greater than the reference hue, that is $$\frac{1}{2}+\frac{b}{r}$$

It is arbitrarily defined that "r" (the total width of plate 29 which is 2 units) is equal to 2R, although it should be understood that the constant of proportionality connecting "r" and "R" may vary from ½ depending on the transmission characteristics of the plate 29 and its coating.

Due to the superposed position of the plates 18 and 29, a portion of the light incident upon any given element of half track 29a passes through a corresponding element of half track 18a to the photoelectric cell 50, the rest of the light being absorbed by the coatings upon the plates in accordance with the values of the functions at the element under consideration. Thus, the light passing through both half tracks 29a, 18a is representative of the product of the light transmitted through the individual half tracks 18a, 29a, that is, $$\frac{1}{4}\left(1-\frac{a}{W}-\frac{b}{R}+\frac{ab}{RW}\right)$$

Similarly, the light incident upon any element of half track 29b passes through a corresponding element of half track 18b to the photoelectric cell 50, the amount passing through both half tracks being respresentative of the product of the light transmitted through the individual half tracks 18a, 29a, that is, $$\frac{1}{4}\left(1+\frac{a}{W}+\frac{b}{R}+\frac{ab}{RW}\right)$$

These products are, of course, added by cell 50 to provide a voltage representative of a constant plus the sum of the functions times a second constant, that is, $$\tfrac{1}{2}\left(1+\frac{ab}{RW}\right)$$

The difference between this product and reference hue of ½ is $$\frac{ab}{2RW}$$

which when multiplied by the constant 2 gives $$\frac{ab}{RW}$$

This final transmission term $$\frac{ab}{RW}$$

is of course numerically equal to the product of the factor "$a$" and "$b$," modified only by the transmission constants R, W. When the cell 50 is properly connected to a recorder, the recording medium indicates directly, by suitable calibration, the product of the functions. The above described multiplication process is summarized in the following table under the heading "General Ordinate":

| | General Ordinate | Ordinates | | | |
|---|---|---|---|---|---|
| | | 26b | 26c | 26d | 26e |
| $f(x)$ | $a$ | .6 | .75 | −.7 | −.4 |
| Upper half track | $\frac{1}{2}\left(1-\frac{a}{W}\right)$ | .2 | .125 | .85 | .7 |
| Lower half track | $\frac{1}{2}\left(1+\frac{a}{W}\right)$ | .8 | .875 | .15 | .3 |
| $g(x)$ | $b$ | .8 | −.55 | −.5 | .8 |
| Upper half track | $\frac{1}{2}\left(1-\frac{b}{R}\right)$ | .1 | .775 | .75 | .1 |
| Lower half track | $\frac{1}{2}\left(1+\frac{b}{R}\right)$ | .9 | .225 | .25 | .9 |
| Product upper half tracks | $\frac{1}{4}\left(1-\frac{a}{W}-\frac{b}{R}+\frac{ab}{RW}\right)$ | .02 | .097 | .638 | .07 |
| Product lower half tracks | $\frac{1}{4}\left(1+\frac{a}{W}+\frac{b}{R}+\frac{ab}{RW}\right)$ | .72 | .196 | .037 | .27 |
| Sum of products | $\frac{1}{2}\left(1+\frac{ab}{RW}\right)$ | .74 | .293 | .675 | .34 |
| Reference | ½ | .50 | .500 | .500 | .50 |
| Difference between sum of products and reference. | $\frac{ab}{2RW}$ | .24 | −.207 | .175 | −.16 |
| Difference Doubled | $\frac{ab}{RW}$ | .48 | −.414 | .350 | −.32 |
| $f(x)\cdot g(x)$ | $ab$ | .48 | −.413 | .35 | −.32 |

When the beam produced by source 47 is a narrow slit, and cell 50 is connected to a recorder, the plates 18, 29 can be moved together in a longitudinal path through the space between lenses 48 and 49, the recorder trace thus producing a continuous graph of the product of the two functions.

The table also shows numerical values for four typical ordinates **26*b*, 26*c*, 26*d*, and 26*e*, from which it will be evident that the light reaching the cell 50** from the element represented by each such ordinate is proportional to a constant plus the algebraic product of the ordinates of the function at that element. The final product $$\frac{ab}{RW}$$

for each ordinate is obtained by substituting the values of "$a$" and "$b$" from the groups 4 and **4*c*, respectively, into the general formulation under the heading "General Ordinate," it being noted that both R and W are numerically equal to unity. Ordinate 26*b* represents a positive value for both functions, and, accordingly, the resulting value is positive, as indicated by graph 4*e*. At ordinates 26*c* and 26*e*, one function is positive and the other function is negative so that the product is negative, as clearly appears from the table and Figure 4*e*. At ordinate 26*d*, both functions are negative so that the product is positive, as also clearly appears from the table and graphs. It will be apparent, therefore, that the apparatus of Figure 8 produces an algebraic multiplication of the functions 23 and 28**, the product being obtained separately for each element of the functions. It will be understood that the photo-electric cell may feed a conventional recorder which is so adjusted as to produce a zero indication when the photoelectric cell output is at its reference value established when both functions are zero.

Referring now to Figure 7, it will be evident that the total output of the photoelectric cell 50 represents the sum of all the elemental products obtained by multiplying the ordinates of the elements of function 23 by the corresponding ordinates representing similar elements of function 28. That is, the photoelectric cell output represents the integral of the product of the two functions over the range determined by the length of the superposed portions of plates 18, 29 which are exposed to the light beam. Thus, referring to Figure 7, and assuming that variable density plate 40 has a length T, this plate being superposed over the first T units of length of plate 18, the output of the recorder fed by the photoelectric cell represents the integral from zero to T of the product of the functions represented by the plates 18 and 40. In mathematical notation, where P represents the output of a suitably calibrated recorder fed by cell 50, $f(x)$ represents the function recorded on plate 18 and $g(x)$ represents the function recorded on plate 40, the recorder output represented by the following equation:

$$P \equiv \int_0^T f(x)g(x)dx$$

Assuming that plate 18 is shifted rightwardly a distance $t_1$ to the position indicated in dotted lines by reference character 18*a*, the output is represented by the following equation:

$$P = \int_0^T f(x-t_1)g(x)dx$$

and, similarly, if plate 18 is shifted to the right, Figure 7, a distance of $t_2$ units to the position represented by dotted lines 18*b*, the output of the photoelectric cell is represented by the equation:

$$P = \int_0^T f(x-t_2)g(x)dx$$

Referring to Figure 8, the plate 18 is moved downwardly at a constant rate during the reproducing period with the result that the recorder output is a function of time representing the integral noted at the preceding paragraph as $t$ varies from zero to any desired value. This function is referred to as the correlation function and has a maximum value when the function represented by plate 40 has the same shape as the function represented by plate 18. That is, the output is a measure of the correlation existing between the two functions. Evidently, where the function 40 represents an elementary event, the occurrence of maxima in the recorder output indicates the time of occurrence of elementary events in the seismograph record of plate 18. If the functions $g$ and $f$ are identical, the output of the photoelectric cell represents the auto-correlation function and has a maximum value when a portion of the function is repeated to a good approximation.

It will be understood that a similar optical system is provided for each seismograph when the apparatus of my invention is utilized in seismic work. In this manner, the output of each seismometer may be analyzed to determine when elementary events occur therein, thus enabling the record to be analyzed with a much greater degree of accuracy than has heretofore been possible. In a practical seismograph recording system, the seismometers are arranged at different distances from the shot point. Thus, the reflections from a given discontinuity appear later in time upon the seismometers further removed from the shot point, this displacement being referred to as "step-out." In carrying out my invention, the relative positions of the seismometer records 51 upon plate 18 may be adjusted longitudinally as by using a separate movable track section for each record together with suitable adjusting screws. This enables the operator to eliminate time variations resulting from step-out. If a regular displacement occurs, proceeding from one seismograph record to another one the plate, it will be caused not by step-out but by dip in the bed producing the reflection. Accordingly, the apparatus of my invention enables the angle of dip of formation to be determined with a great degree of accuracy.

In another aspect of the invention, the functions recorded on the variable density plates may be mathematical functions representing the transformations produced by an ideal electrical filter. In this case, the output of the photoelectric cell for each set of tracks is proportional to the original seismometer output as modified by the ideal electrical filter. Furthermore, if the output of one seismometer is recorded upon the variable area plate and the output of another seismometer is recorded on the variable density plate, the output of the photoelectric cell represents the combined or mixed outputs of the two seismometers. The output of the photoelectric cell may, if desired, be utilized to produce a variable area track or a variable density track which may be utilized in combination with the record of a third seismometer to produce a combined or mixed output of three or even more seismometers. This same result may be achieved optically by use of half-silvered mirrors which optically combine the transmission characteristics of three or even more optical paths.

Under actual operating conditions, the output of the seismic apparatus is the result of a multitude of effects of various origins. The initial shot sends of a dilatational wave, a shear wave and a surface wave. The dilatational wave is used in standard methods of prospecting, while the shear wave is considered objectionable at present, and the surface wave is objectionable and will remain so, since it is propagated through the surface layers and is not influenced by structures below the surface. The wind causes objectionable ground motion by blowing against trees, rocks, fences and by blowing over the surface itself. The seismometers measure certain components of the resultant of all these motions.

The dominant frequency of the surface waves varies between 5 and 30 cycles per second, and the dominant frequency of the reflected dilatational wavelets varies from 20 to 70 cycles per second. The wind gives components over the entire useful frequency range. By transforming the seismograph record in a manner equivalent to operating upon it with an ideal electrical filter, the components representative of surface waves are substantially eliminated, and the signal to noise ratio over random disturbances, such as wind, is greatly improved.

Alternatively, the procedure may consist of making a recording, determining the shape of its elementary event from the auto-correlation function computed by the machine, and transforming the recording subsequently into a record such as would have been obtained if a tuning with ideal impulsive response had been used. This last operation is again performed by the reproducer.

It should be noted that in the results thus obtained the apparent tuning, used to obtain the final record, depends upon the elementary event, i. e., upon the motion of the ground during the recording. It is not possible to effect this dependency with any present system of seismographic recording. Although I am aware of systems in which a record is played back through an electrical system, the apparatus utilized is so complicated as to be of prohibitive cost for practical seismograph work.

Moreover, the important problem of synthesizing an ideal record where the sub-surface stratification is known or assumed, can be solved by the computer of my invention. If the sub-surface stratification is known, the theoretical disposition of the elementary events on the record can be computed. Unit impulses are placed on these calculated spots and this record is impressed upon the variable area plate while the variable density plate has the elementary event recorded thereon. A record is obtained that consists of a sum of elementary events, each in its correct position, which is an ideal record for the assumed or known sub-surface stratification.

Although the computer has been described primarily in connection with seismic work, it is extremely useful in other applications. For example, it has been explained that any equation of the form $$P = \int_0^T f(x-t)g(x)dx$$

may be solved by properly recording the functions and combining them with the optical apparatus of my invention. By merely reversing the direction of movement of the plate 18 through the apparatus of Figure 8, the solution to the following equation may be obtained $$P=\int_0^T f(x+t)g(x)dx$$

Furthermore, by turning the plate 18 through an angle of 180 degrees and then moving it between the lenses 48, 49 of Figure 8, the solution to the following equation is obtained $$P=\int_0^T f(t-x)g(x)dx$$

In mathematical parlance, equations of this type, which include the folding integral, the cross-correlation function, the auto-correlation function, the Duhamal integral and other similar equations, are important in network and mathematical theory and in many practical computations, the solutions to these equations having heretofore required long and tedious hand computation. I also contemplate that the variable density plate may have, in addition to the density changes produced by the recording system a preselected density gradient, such as a progressive density gradient proceeding from one side to the other side of the track. This has the effect of accentuating positive peaks and depressing negative peaks in the signal to be recorded or, alternatively, of increasing the negative peaks and decreasing the positive peaks.

While the invention has been described in connection with present, preferred embodiments thereof, it is to be understood that this description is illustrative only and is not intended to limit the invention, the scope of which is defined by the appended claims.

I claim:

1. Apparatus for algebraically multiplying two variables which comprises, in combination, an elongated plate of radiation-transmitting material having an upper zone and a lower zone, the radiation transmission characteristics of the upper zone varying with respect to a standard transmission, in accordance with the positive values of a first function, the radiation transmission characteristics of said lower zone varying, with respect to said standard transmission, in accordance with the negative values of said function, a second elongated plate of radiation-transmitting material having an upper zone and a lower zone, the radiation transmission characteristics of said upper zone varying, with respect to a standard transmission, in accordance with the positive values of a second function, the radiation transmission characteristics of the lower zone varying, with respect to said standard transmission, in accordance with the negative values of said function, a radiation detector, means for passing beams of radiation through selected portions of the upper zones of both plates to said detector, and means for passing beams of radiation through selected portions of both lower zones of said plates to said detector.

2. Apparatus for algebraically multiplying two variables which comprises, in combination, an elongated plate of radiation-transmitting material having an upper zone and a lower zone, the radiation transmission characteristics of the upper zone varying, with respect to a standard transmission, in accordance with the positive values of a first function, the radiation transmission characteristics of said lower zone varying, with respect to said standard transmission, in accordance with the negative values of said function, a second elongated plate of radiation-transmitting material having an upper zone and a lower zone, the radiation transmission characteristics of said upper zone varying, with respect to a standard transmission, in accordance with the positive values of a second function, the radiation transmission characteristics of the lower zone varying, with respect to a standard transmission, in accordance with the negative values of said function, a radiation detector, means for passing a thin beam of radiation through adjacent sections of the upper and lower zones and both of said plates to said detector, and means for effecting longitudinal movement of both plates as a unit relative to said beam of radiation.

3. Apparatus for algebraically multiplying and integrating two variables which comprises, in combination, an elongated plate of radiation-transmitting material having an upper zone and a lower zone, the radiation transmission characteristics of the upper zone varying, with respect to a standard transmission, in accordance with the positive values of a first function, the radiation transmission characteristics of said lower zone varying, with respect to said standard transmission, in accordance with the negative values of said function, a second elongated plate of radiation-transmitting material having an upper zone and a lower zone, the radiation transmission characteristics of said upper zone varying, with respect to a standard transmission, in accordance with the positive values of a second function, the radiation transmission characteristics of the lower zone varying, with respect to said standard transmission, in accordance with the negative values of said function, a radiation detector, means for passing parallel beams of radiation through selected portions of the upper zones of both plates to said detector, means for passing parallel beams of radiation through selected portions of both lower zones to said detector, and a recorder fed by said detector, said recorder being calibrated to indicate directly the integral of the product of said functions over a preselected range of integration.

4. Apparatus for algebraically multiplying two variables which comprises, in combination, an elongated plate of radiation-transmitting material having an upper zone and a lower zone, the radiation transmission characteristics of the upper zone varying, with respect to a standard transmission, in accordance with the positive values of a first function, the radiation transmission characteristics of said lower zone varying, with respect to said standard transmission, in accordance with the negative values of said function, a second elongated plate of radiation-transmitting material having an upper zone and a lower zone, the radiation transmission characteristics of said upper zone varying, with respect to a standard transmission, in accordance with the positive values of a second function, the radiation transmission characteristics of the lower zone varying, with respect to said standard transmission in accordance with the negative values of said second function, a radiation detector, means for passing parallel beams of radiation through selected portions of the upper zones of both plates to said detector, means for passing parallel beams of radiation through selected portions of both lower zones to said detector, and means for moving one of said plates in a longitudinal path with respect to the other of said plates.

5. Apparatus for algebraically multiplying two variables which comprises, in combination, an elongated plate of radiation-transmitting material having an upper zone and a lower zone, the radiation transmission characteristics of the upper zone varying in accordance with a constant minus the values of a first function, the radiation transmission characteristics of the lower zone varying in accordance with said constant plus the values of said function, a second elongated plate of radiation-transmitting material having an upper zone and a lower zone, the radiation transmission characteristics of said upper zone varying in accordance with a constant minus the values of a second function, the radiation transmission characteristics of the lower zone varying in accordance with said second constant plus the values of said second function, a radiation detector, means for passing parallel beams of radiation through selected portions of the upper zones of both plates to said detector, and means for passing parallel beams of radiation through selected portions of both lower zones to said detector.

6. Apparatus for algebraically multiplying two variables which comprises, in combination, an elongated plate of radiation-transmitting material having an upper zone and a lower zone, the radiation transmission characteristics of the upper zone varying in accordance with a constant minus the values of a first function, the radiation transmission characteristics of the lower zone varying in accordance with said constant plus the values of said function, a second elongated plate of radiation-transmitting material having an upper zone and a lower zone, the radiation transmission characteristics of said upper zone varying in accordance with a constant minus the values of a second function, the radiation transmission characteristics of the lower zone varying in accordance with said second constant plus the values of said second function, a radiation detector, means for passing parallel beams of radiation through selected portions of the upper zones of both plates to said detector, means for passing parallel beams of radiation through selected portions of both lower zones to said detector, and means for moving one of said plates in a longitudinal path with respect to the other of said plates.

7. Apparatus for algebraically multiplying two variables which comprises, in combination, a plate of radiation-transmitting material divided into two longitudinally extending, adjacent zones, a band of radiation absorbing material on said plate which is displaced laterally thereon in accordance with the values of a function, said band having a portion thereof positioned within each of said zones throughout its length, a second plate of radiation-transmitting material divided into two longitudinally extending, adjacent zones, a layer of radiation absorbing material on said second plate, the opacity of said layer in one zone varying, with respect to a reference opacity, in accordance with the positive values of a second function, the opacity of said layer in the other zone varying, with respect to said reference opacity, in accordance with the negative values of said second function, a radiation detector, and means for passing radiation through both plates to said detector.

8. Apparatus for algebraically multiplying two variables which comprises, in combination, a plate of radiation-transmitting material divided into two longitudinally extending, adjacent zones, a band of radiation absorbing material on said plate which is displaced laterally thereon in accordance with the values of a function, said band having a portion thereof positioned within each of said zones throughout its length, a second plate of radiation-transmitting material divided into two longitudinally extending, adjacent zones, a layer of radiation absorbing material on said second plate, the opacity of said layer in one zone varying, with the positive respect to a reference opacity, in accordance with values of a second function, the opacity of said layer in the other zone varying, with respect to said reference opacity, in accordance with the negative values of said second function, a radiation detector, means for passing a slit of radiation through both plates to said detector, and means for moving said plates in unison so that the slit is traversed by said plates in a longitudinal path, whereby the detector output represents the product of said functions plotted against time.

9. Apparatus for algebraically multiplying and integrating two variables which comprises, in combination, a plate of radiation-transmitting material divided into two longitudinally extending, adjacent zones, a band of radiation absorbing material on said plate which is displaced laterally thereon in accordance with the values of a function, said band having a portion thereof positioned within each of said zones throughout its length, a second plate of radiation-transmitting material divided into two longitudinally extending, adjacent zones, a layer of radiation absorbing material on said second plate, the opacity of said layer in one zone varying, with the positive respect to a reference opacity, in accordance with values of a second function, the opacity of said layer in the other zone varying, with respect to said reference opacity, in accordance with the negative values of said second function, a radiation detector, means for directing radiation through a longitudinal band of both plates to said detector, whereby the detector output represents the integral of the products of said functions over a predetermined interval of time.

10. Apparatus for algebraically multiplying and integrating two variables which comprises, in combination, a plate of radiation-transmitting material divided into two longitudinally extending, adjacent zones, a band of radiation absorbing material on said plate which is displaced laterally thereon in accordance with the values of a function, said band having a portion thereof positioned within each of said zones throughout its length, a second plate of radiation-transmitting material divided into two longitudinally extending, adjacent zones, a layer of radiation absorbing material on said second plate, the opacity of said layer in one zone varying, with respect to a reference opacity, in accordance with the positive values of a second function, the opacity of said layer in the other zone varying, with respect to said reference opacity, in accordance with the negative values of said second function, a radiation detector, a radiation source, means for directing radiation from said source through a longitudinal band of both plates and thereafter upon said radiation detector, whereby the detector output represents the integral of the products of said functions over a predetermined interval of time, and means for effecting relative longitudinal movement between said plates.

11. Apparatus for algebraically multiplying two variables which comprises, in combination, an elongated plate of transparent material divided into two longitudinally extending, adjacent zones, a band of opaque material on said plate which is displaced laterally thereon in accordance with the values of a function, said band having a portion thereof positioned within each of said zones throughout its length, a second elongated plate of transparent material divided into two longitudinally extending, adjacent zones positioned adjacent the respective zones of said first plate, a layer of material on said second plate, the opacity of said layer in one zone varying, with respect to a reference opacity, in accordance with the positive values of a second function, the opacity of said layer in the other zone varying with respect to said reference opacity in accordance with the negative values of said second function, a photoelectric cell, and a light source having an elongated filament positioned transversely of said plates and spaced therefrom so as to pass parallel beams of light through both plates to the photoelectric cell.

12. Apparatus for algebraically multiplying two variables which comprises, in combination, an elongated plate of transparent material divided into two longitudinally extending, adjacent zones, a band of opaque material on said plate which is displaced laterally thereon in accordance with the values of a function, said band having a portion thereof positioned within each of said zones throughout its length, a second elongated plate of transparent material divided into two longitudinally extending, adjacent zones positioned adjacent the respective zones of said first plate, a layer of material on said second plate, the opacity of said layer in one zone varying, with respect to a reference opacity, in accordance with the positive values of a second function, the opacity of said layer in the other zones varying, with respect to said reference opacity, in accordance with the negative values of said second function, a photoelectric cell, means for passing a slit of light through both plates to said cell, and means for moving said plates in unison so that the slit traverses said plates in a longitudinal path, whereby the photoelectric cell output represents the product of said functions plotted against time.

13. Apparatus for algebraically multiplying and integrating two variables which comprises, in combination, an elongated plate of transparent material divided into two longitudinally extending, adjacent zones, a band of opaque material on said plate which is displaced laterally thereon in accordance with the values of a function, said band having a portion thereof positioned within each of said zones throughout its length, a second elongated plate of transparent material divided into two longitudinally extending, adjacent zones positioned adjacent the respective zones of said first plate, a layer of material on said second plate, the opacity of said layer in one zone varying, with respect to a reference opacity, in accordance with the positive values of a second function, the opacity of said layer in the other zone varying, with respect to said reference opacity, in accordance with the negative values of said second function, a photoelectric cell, a light source having a filament positioned transversely of said plates and spaced therefrom, means for directing the radiation from said filament though a band of preselected length on said plates to said photoelectric cell, whereby the cell output represents the integral of the products of said functions over a predetermined interval of time.

14. Apparatus for algebraically multiplying and integrating two variables which comprises, in combination, an elongated plate of transparent material divided into two longitudinally extending, adjacent zones, a band of opaque material on said plate which is displaced laterally thereon in accordance with the values of a function, said band having a portion thereof positioned within each of said zones throughout its length, a second elongated plate of transparent material divided into two longitudinally extending adjacent zones which are superimposed upon the respective zones of said first plate, a layer of material on said second plate, the opacity of said layer in one zone varying, with respect to a reference opacity, in accordance with the positive values of a second function, the opacity of said layer in the other zone varying the respect to said reference opacity in accordance with the negative values of said second function, a photoelectric cell, a light source having an elongated filament, means for directing light from said filament through a longitudinal band of both plates to said photoelectric cell, whereby the cell output represents the integral of the product of said functions over a predetermined interval of time, and means for moving said first plate in a longitudinal path through said band of light, whereby the cell output represents the integral, over a preselected range of the product of the second function and the first function shifted along its axis.

15. Apparatus for transforming and recording seismic signals which comprises, in combination, a plate of transparent material divided into two longitudinally extending, adjacent zones, a band of opaque material on said plate which is displaced laterally thereon with respect to the center of said plate in accordance with the amplitude of seismic signals to be recorded, the width of said band being one-half the width of said plate, a second plate of radiation-transmitting material divided into two longitudinally extending, adjacent zones, a layer of opaque material on said second plate, the opacity of said layer in one zone varying, with respect to a reference opacity, in accordance with the positive values of a function, the opacity of said layer in the other zone varying, with respect to said reference opacity, in accordance with the negative values of said function, a photoelectric cell, means for passing light in parallel beams through preselected regions of both plates to said photoelectric cell, and means for moving said first plate longitudinally with respect to said second plate, whereby the photoelectric cell output is representative of a transformed seismic signal.

16. Apparatus in accordance with claim 15 in which said function represents the characteristics of an ideal electrical filter.

17. Apparatus in accordance with claim 15 in which said function represents the wave form of an ideal elementary event whereby, upon relative movement between the plates, the cross correlation function between the seismic record and the elementary event is obtained.

18. Apparatus in accordance with claim 15 in which the density of said second plate varies proceeding from one side of the other of said plates.

19. Apparatus in accordance with claim 15 in which the first plate includes a plurality of dual zone recordings, a timing wave, and an alignment line, the second plate carrying a plurality of dual zone recordings adapted to be superimposed over the respective recordings on the first plate, and an alignment line on said second plate for permitting precise alignment of said plates.

20. Apparatus for multiplying two variables comprising, in combination, a pair of adjacently positioned elongated plates of radiation transmitting material, each of said plates having an upper and a lower zone extending longitudinally of said plates, the radiation transmission characteristics of the upper zone of said first plate being varied with respect to a standard transmission, in accordance with the positive values of a first function, the radiation transmission characteristics of the lower zone of said first plate being varied with respect to said standard transmission, in accordance with the negative values of said function, the radiation transmission characteristics of the upper zone of said second plate being varied with respect to a standard transmission, in accordance with the positive values of a second function, the radiation transmission characteristics of the lower zone of said second plate being varied with respect to said standard transmission, in accordance with the negative values of said second function, and means to retain said plates adjacent one another whereby two parallel beams of radiation can be transmitted through two said plates so that one of said beams is directed through the upper zones of said first and second plates and the other of said beams is directed through the lower zones of said first and second plates.

21. Apparatus for multiplying two variables comprising, in combination, a pair of adjacently positioned elongated plates of radiation transmitting material, each of said plates having an upper and a lower zone extending longitudinally of said plates, the radiation transmission characteristics of the upper zone of said first plate being varied in accordance with a constant minus the values of a first function, the radiation transmission characteristics of the lower zone of said first plate being varied in accordance with said constant plus the values of said first function, the radiation transmission characteristics of the upper zone of said second plate being varied in accordance with a second constant minus the values of a second function, the radiation transmission characteristics of the lower zone of said second plate being varied in accordance with said second constant plus the values of said second function, and means to retain said plates adjacent one another whereby two parallel beams of radiation can be transmitted through two said plates so that one of said beams is directed through the upper zones of said first and second plates and the other of said beams is directed through the lower zones of said first and second plates.

22. Apparatus for multiplying two variables comprising, in combination, a pair of adjacently positioned elongated plates of radiation transmitting material, said first plate being divided into two longitudinally extending adjacent zones and having a band of radiation absorbing material disposed thereon, said band being displaced laterally in accordance with the values of a first function, said band having a portion thereof positioned within each of said zones throughout its length, said second plate being divided into two longitudinally extending adjacent zones and having a layer of radiation absorbing material disposed thereon, the opacity of said layer in one zone being varied with respect to a reference opacity, in accordance with the positive values of a second function, the opacity of said layer in the other zone being varied with respect to said reference opacity, in accordance with the negative values of said second function, and means to retain said plates adjacent one another whereby two parallel beams of radiation can be transmitted through two said plates so that one of said beams is directed through the upper zones of said first and second plates and the other of sad beams is directed through the lower zones of said fist and second plates.

23. Apparatus for interpreting seismic signals comprising a transducer to detect vibrations incident thereon, means responsive to said transducer to establish a first signal representative of vibrations incident upon said transducer, means to establish a quantity representative of a preselected vibration pattern, means to multiply a portion of said first signal by said quantity, and means to vary continuously and progressively the portion of said first signal which is multiplied by said quantity.

24. Apparatus for interpreting seismic signals comprising a transducer to detect vibrations incident thereon, means responsive to said transducer to establish a first signal representative of vibrations incident upon said transducer, means to establish a quantity representative of a preselected vibration pattern, means to multiply a portion of said first signal by said quantity, means to integrate the product of said multiplication, means to vary progressively the portion of said first signal which is multiplied by said quantity, and means to record the output of said means to integrate, whereby the recorded quantity is a maximum when the two factors being multiplied are most nearly alike.

25. The combination in accordance with claim 24 wherein said quantity is representative of the output signal of a seismometer when a reflected seismic vibration is incident on the seismometer in the absence of random noise vibrations.

26. Apparatus for interpreting seismic signals comprising a transducer to detect vibrations incident thereon, means responsive to said transducer to establish a first signal representative of vibrations incident upon said transducer comprising means to expose a first photographic plate, means to establish a quantity representative of a preselected vibration pattern comprising means to expose a second photographic plate, means to multiply a portion of said first signal by said quantity comprising means to transmit radiation through the two plates and means to measure the transmitted radiation, and means to vary the portion of said first signal which is multiplied by said quantity comprising means to move one of the plates relative to the other plate.

27. Apparatus for interpreting seismic signals comprising a seismograph signal track, means responsive to said track to establish a signal which is a function of a portion of the seismic signal on said track, means to establish a quantity representative of a preselected function, means to multiply said signal by said preselected function, and means to vary progressively the portion of said track which is multiplied by said preselected function.

28. Apparatus for interpreting seismic signals comprising a seismograph signal track, means responsive to said track to establish a signal which is a function of a portion of the seismic signal on said track, means to establish a quantity representative of a preselected function, means to multiply said signal by said preselected function, means to integrate the product of the multiplication, means to vary progressively the portion of said track which is multiplied by said preselected function, and means to record the output of said means to integrate.

29. The method of seismic surveying which comprises creating seismic waves at a given location adjacent the earth's surface, receiving at a position spaced from said location the resultant seismic waves after travel through the sub-surface, forming the product of at least one of the received waves and a pattern wave having the form of a desired seismic wave substantially free of noise, forming the integral of said product over a period of time, and indicating the varying values of said integral for different phase relations between said received and said pattern waves.

References Cited in the file of this patent

UNITED STATES PATENTS

| | | |
|---|---|---|
| 1,828,328 | Legg | Oct. 20, 1931 |
| 1,923,746 | Pomeroy | Aug. 22, 1933 |
| 2,098,326 | Wente | Nov. 9, 1937 |
| 2,118,894 | Morrissey | May 31, 1938 |
| 2,157,878 | Worstell | May 9, 1939 |
| 2,179,000 | Tea | Nov. 7, 1939 |
| 2,287,965 | Borberg | June 30, 1942 |
| 2,540,105 | Dunbar et al. | July 30, 1945 |
| 2,397,027 | Maurer | Mar. 19, 1946 |
| 2,406,702 | Morreall | Aug. 27, 1946 |
| 2,495,790 | Valensi | Jan. 31, 1950 |
| 2,497,042 | Doll | Feb. 7, 1950 |
| 2,643,819 | Lee et al. | June 30, 1953 |
| 2,638,402 | Lee | May 12, 1953 |
| 2,688,124 | Doty, et al. | Aug. 31, 1954 |

FOREIGN PATENTS

| | | |
|---|---|---|
| 5,628 | Great Britain | Mar. 5, 1902 |

UNITED STATES PATENT OFFICE

CERTIFICATE OF CORRECTION

Patent No. 2,839,149 June 17, 1958

Raymond G. Piety

It is hereby certified that error appears in the printed specification of the above numbered patent requiring correction and that the said Letters Patent should read as corrected below.

Column 2, line 44, for "transfomed" read --transformed--; column 5, lines 5 and 6, strike out "rotational seismometer responsive only to"; column 7, line 70, for "transmtited there through" read --transmitted therethrough--; column 9, line 29, for "factor" read --factors--; column 11, line 63, for "one" read --on--; column 12, line 15, for "of", second occurrence, read --out--; column 15, line 49, strike out "the positive" and insert the same before "values" in line 50; lines 72 and 73, strike out "the positive" and insert the same before "values" in line 74; column 17, line 39, for "the respect" read --with respect--; column 18, line 8, for "of", first occurrence, read --to--; column 19, line 11, for "sad" read --said--; line 12, for "fist" read --first--.

Signed and sealed this 14th day of October 1958.

(SEAL)

Attest:

KARL H. AXLINE
Attesting Officer

ROBERT C. WATSON
Commissioner of Patents